(12) United States Patent
Schomaker et al.

(10) Patent No.: US 11,104,508 B2
(45) Date of Patent: Aug. 31, 2021

(54) TRANSPORT DEVICE FOR A MILLING UNIT, TRANSPORT VEHICLE, AND METHOD FOR TRANSPORTING A MILLING UNIT

(71) Applicant: BOMAG GmbH, Boppard (DE)

(72) Inventors: Rafael Schomaker, Lingen (DE); Joachim Ponstein, Gondershausen (DE); Maximilian Philippsen, Gingen An Der Fils (DE); Thomas Thelen, Monreal (DE)

(73) Assignee: BOMAG GmbH, Boppard (DE)

( * ) Notice: Subject to any disclaimer, the term of this patent is extended or adjusted under 35 U.S.C. 154(b) by 765 days.

(21) Appl. No.: 15/383,517

(22) Filed: Dec. 19, 2016

(65) Prior Publication Data

US 2017/0174422 A1 Jun. 22, 2017

(30) Foreign Application Priority Data

Dec. 21, 2015 (DE) .......................... 102015016672.7

(51) Int. Cl.
| | |
|---|---|
| *B60P 1/54* | (2006.01) |
| *B65D 88/12* | (2006.01) |
| *B65D 90/00* | (2006.01) |
| *B65D 90/18* | (2006.01) |
| *B65D 85/68* | (2006.01) |
| *B65D 88/54* | (2006.01) |
| *B65D 90/12* | (2006.01) |
| *B60P 1/64* | (2006.01) |

(Continued)

(52) U.S. Cl.
CPC ................ *B65D 88/12* (2013.01); *B60P 1/54* (2013.01); *B65D 85/68* (2013.01); *B65D 88/129* (2013.01); *B65D 88/54* (2013.01); *B65D 90/006* (2013.01); *B65D 90/12* (2013.01); *B65D 90/18* (2013.01); *B60P 1/483* (2013.01); *B60P 1/6427* (2013.01); *B65D 2585/6897* (2013.01); *E01C 23/088* (2013.01)

(58) Field of Classification Search
CPC .................................. B65D 85/68; B60P 1/54
USPC .................................................. 414/498, 679
See application file for complete search history.

(56) References Cited

U.S. PATENT DOCUMENTS

| | | | |
|---|---|---|---|
| 1,619,941 A | 3/1927 | Kennedy |
| 1,928,475 A | 9/1933 | Batie |
| 3,757,972 A | 9/1973 | Martin |
| (Continued) | | |

FOREIGN PATENT DOCUMENTS

| | | |
|---|---|---|
| AT | 223119 B | 8/1962 |
| CN | 2400315 Y | 10/2000 |
| (Continued) | | |

OTHER PUBLICATIONS

State Intellectual Property Office of the People's Republic of China, Notification of the First Office Action, Application No. 201611185801.5, dated Sep. 7, 2018 (16 pages).

(Continued)

*Primary Examiner* — Jonathan Snelting
(74) *Attorney, Agent, or Firm* — Wood Herron & Evans LLP

(57) ABSTRACT

The present invention relates to a milling unit, in particular to a milling unit of a road milling machine, a transport vehicle with a transport device and a vehicle, as well as a method for transporting a milling unit, in particular using a transport vehicle according to the present invention.

20 Claims, 6 Drawing Sheets

(51) Int. Cl.
*B60P 1/48* (2006.01)
*E01C 23/088* (2006.01)

(56) References Cited

U.S. PATENT DOCUMENTS

| | | | |
|---|---|---|---|
| 3,874,537 A | 4/1975 | Kou | |
| 5,213,466 A * | 5/1993 | Bubik | B60P 1/6463 414/494 |
| 5,618,146 A * | 4/1997 | Cooper | A01D 90/083 414/24.5 |
| 6,253,976 B1 * | 7/2001 | Coleman | B60R 9/00 224/281 |
| 6,550,704 B2 * | 4/2003 | Johnson | B02C 18/067 241/101.2 |
| 7,744,333 B2 * | 6/2010 | Chaddock | B60P 1/6427 414/542 |
| 2004/0156703 A1 | 8/2004 | Benedikt | |
| 2007/0212205 A1 * | 9/2007 | Lowecki | B60P 1/6463 414/498 |
| 2012/0284989 A1 | 11/2012 | Busley et al. | |

FOREIGN PATENT DOCUMENTS

| | | |
|---|---|---|
| CN | 2818222 Y | 9/2006 |
| CN | 102747675 A | 10/2012 |
| CN | 202593349 U | 12/2012 |
| DE | 1166699 A | 3/1964 |
| DE | 1244655 A | 7/1967 |
| DE | 2617638 A1 | 11/1977 |
| DE | 2842173 A1 | 4/1980 |
| DE | 29603750 U1 | 5/1996 |
| DE | 102011018222 A1 | 10/2012 |
| DE | 202011110042 U1 | 2/2013 |
| FR | 2261217 A1 | 9/1975 |

OTHER PUBLICATIONS

State Intellectual Property Office of the People's Republic of China, Notification of the First Office Action, Application No. 201611190050.6, dated Mar. 20, 2019 (22 pages).

* cited by examiner

TRANSPORT DEVICE FOR A MILLING UNIT, TRANSPORT VEHICLE, AND METHOD FOR TRANSPORTING A MILLING UNIT

CROSS-REFERENCE TO RELATED APPLICATIONS

The present application claims priority under 35 U.S.C. § 119 of German Patent Application No. 10 2015 016 672.7, filed Dec. 21, 2015, the disclosure of which is hereby incorporated herein by reference in its entirety.

FIELD OF THE INVENTION

The present invention relates to a transport device for a milling unit, in particular a milling unit of a road milling machine, to a transport vehicle with a carrier vehicle, in particular a swap body vehicle, and to a transport device as well as a method for transporting a milling unit, in particular using a transport vehicle according to the present invention.

BACKGROUND OF THE INVENTION

During operation of road milling machines, in particular of the large-scale milling machine type, there is often a need to replace the milling unit composed of milling drum box and milling drum, for example, in order to enable different working widths. Such road milling machines are often used in road construction for the controlled removal of the cover layer of asphalt roads. Essential elements of such a road milling machine are a machine part comprising a machine frame, an operator platform, a drive engine as well as travelling devices such as wheels and/or crawler tracks, which are driven by the drive engine. The travelling devices are usually connected to the machine frame via height-adjustable lifting columns, so that the distance of the machine frame to the ground is adjustable in the vertical direction by adjustment of the lifting columns. Furthermore, the road milling machine comprises, as the milling part, the milling unit comprising the milling drum for milling ground material and the milling drum box for covering the milling drum to the sides and to the top. Usually, the milling drum comprises a hollow-cylindrical support tube and a plurality of milling tools arranged on the outer jacket surface of the support tube. The milling unit can be detachably fastened, usually to the machine frame of the road milling machine, via a fastening device which retains the milling unit to the road milling machine. Such a road milling machine is known from DE 10 2011 018 222 A1, for example.

Often times, the machine per se and the milling unit are transported separately in order to not have to use heavy duty vehicles due to the existing legal restrictions with respect to maximum transport dimensions and maximum transport weight. It will be readily appreciated that working times as short as possible are desired for dismounting and mounting the milling unit from/to the machine part. Moreover, there is often a need to be able to mill different milling widths with one and the same road milling machine. In this regard, it is preferred when different milling units can be mounted in an alternating manner and rapidly replaced on one and the same road milling machine. Often times, the milling unit is detachably connected to the machine part via massive fastening screws and corresponding locking nuts or also via other types of detachable fastening devices.

The most time-consuming step of the dismounting and mounting process often consists in the positioning of the milling unit relative to the road milling machine. Related special-purpose vehicles which are self-propelled, self-steered and height-adjustable, for example, often need to be transported separately and are very expensive. Moreover, there is only limited space available, in particular in road construction sites, so that space-consuming maneuvering is not possible.

SUMMARY OF THE INVENTION

The object of the present invention thus is to provide a possibility to improve the transport of the milling unit, in particular to and away from said machine, and to facilitate the mounting process as much as possible.

One aspect of the present invention is a transport device for a milling unit, in particular a milling unit of a road milling machine. The object of the present invention is, on the one hand, to provide a cost-effective way to transport the milling unit between different places with the transport device. On the other hand, the mounting process and, in particular, the pre-positioning of the transport device relative to the road milling machine is to be facilitated at the same time. To this end, according to an exemplary embodiment of the present invention, the transport device comprises a support frame which in particular constitutes the bottom structure of the transport device. Appropriately, the support frame is configured to be stable and as flat as possible. According to one embodiment of the present invention, the transport device further comprises a support skid for the milling unit, the support skid being arranged on the support frame, in particular such that it is displaceable in the horizontal plane. With the support skid, a unit is provided which is intended for supporting the milling unit on the transport device. With the support skid, the milling unit can also be moved or displaced on the transport device relative to the support frame. Thus, the transport device itself according to the present invention is suitable for moving the milling unit into different relative positions relative to the basic structure formed by the support frame by using the support skid. This relates, in particular, to movements of the support skid in the horizontal plane, with the transport device placed on the ground. According to one embodiment of the present invention, the transport device also comprises a transport vehicle connector for coupling to a carrier vehicle, in particular a so-called swap body vehicle or hooklift vehicle. Thus, the transport vehicle connector is a unit to which a carrier vehicle with which the transport device as a whole is transported is coupled in order to load and/or unload the transport device from the carrier vehicle. Such vehicles are basically known and are often used for loading so-called roll-of dumper troughs or similar devices. Such a swap body vehicle is described, for example, in DE 2617638 A1. The advantage of the transport device according to the present invention overall thus is, on the one hand, its relatively cost-effective implementation, and, on the other hand, the specific suitability to facilitate and to speed-up the transport, mounting and dismounting process of the milling unit on a road milling machine.

The core function of the support frame in the first place is to form the basic support structure of the transport device, in particular also for the transport of the milling unit. The specific configuration of the support frame may vary greatly. It is preferred that the support frame directly forms the bottom structure of the transport device. This means that the support frame is formed such that it stands directly on the ground when the transport device has been placed on the ground. Preferably, the support frame is configured to be essentially rectangular, its longitudinal extension usually extending in forward transporting direction (when the transport device is loaded onto the carrier vehicle). For the specific construction, the use of at least one longitudinal and/or at least one transverse strut has turned out as a preferred element for the support frame. For example, in one embodiment it is ideal when at least two longitudinal struts extending in the longitudinal direction of the support frame, in particular parallel to one another, form an element of the support frame. To increase the overall stability of the support frame, it is further preferred if the longitudinal struts are connected to one another via several transverse struts. A bottom plate, which at least partially closes the transport device upwardly in the area of the bottom structure, may be part of the support frame. The bottom plate is preferably formed as a continuous surface. Additionally, or alternatively, the support frame further comprises at least one ground roll. The at least one ground roll is preferably arranged on the front surface of the support frame opposite the transport vehicle connector and protrudes therefrom downward to the ground. Thus, the transport device can roll on the ground via the bottom roll, in particular when it is lifted on the respective opposite side, in particular via the transport vehicle connector. This facilitates maneuvering of the transport device when placed on the ground.

To enable a defined displaceability of the support skid on the support frame, said support skid preferably comprises a guiding device which is configured such that it guides the support skid along a movement track. Using the guiding device therefore ensures that the support skid can be displaced along a defined movement track. Movement track, in particular, refers to the movement distance of the support skid relative to the support frame.

With respect to the specific configuration of the guiding device, various measures can be taken. It is, for example, preferred if the guiding device comprises at least one guiding rail along which a rolling device runs. The guiding rail may be arranged on the support skid and the rolling device on the support frame, although a reverse arrangement, i.e., the arrangement of the rolling device on the support skid is preferred here. Guiding rails can easily be obtained and frictional resistance to the rail can be significantly reduced by integrating a rolling device. Altogether, the support skid can thereby be moved more easily on the support frame. Additionally, or alternatively, the guiding device may also comprise a guiding slot in which a rolling device runs. The guiding slot can, in particular, be a guiding groove or similar. It is also possible to equip the guiding device with a switch by means of which various guiding tracks can optionally be linked. Thus, according to this embodiment of the present invention, the guiding device comprises at least two different movement tracks. By using the switch, it is possible to set the movement track along which the support skid will move. The range of application of the transport device according to the present invention can be further expanded if the guiding device comprises at least on extension element by which the guiding track can be extended beyond the support frame. This enables particularly flexible adjustment to individual mounting situations. Such an extension element may, in particular, consist in mountable rails or comparable guiding tracks, for example. These may be arranged on the support frame such that they are displaceable, for example, between a stowage position and a displacement position. An embodiment of the present invention with individual extension elements that can be attached separately is comprised in the present invention as well. Specifically, the extension elements may be rail modules, for example, which can be attached to the guiding device on the support frame.

Basically, the support skid can slide along the guiding device, for example, via a sliding bearing. It is, however, preferred if the support skid comprises a rolling device, in particular rolls with which it rests on the support frame and, in particular, on a guiding device. This facilitates displacement of the support skid. It is ideal if in each case one roll is present on the opposite outer corners of the support skid. Furthermore, further rolls may be provided on the support skid. The rolls may be arranged inside and covered toward the outer face. To that end, corresponding protection plates may be provided, for example, which cover the rolls toward the outer face of the support skid. The risk of injuries for operators can thereby be reduced.

Furthermore, the support skid is preferably designed to be adapted to the milling unit. This may, in particular, mean that the support skid comprises a milling unit receptacle. The milling unit receptacle is characterized by the fact that its shape guarantees a particular reliable and favorable support of the milling unit on the support skid. In particular, with respect to its surface facing the milling unit, the milling unit receptacle is thus designed in a shape adapted to the milling unit.

To this end, the milling unit receptacle may comprise a support tray which is open upwardly. The support tray is adapted to the cutting circle radius of the milling tools of the milling unit and designed a little larger with respect thereto. Therefore, the support tray has an outer surface in the shape of a cylinder segment and allows for the milling unit, coming from above, to be put down in the direction of the support tray onto the support skid. To take care of the individual milling tools, the milling unit receptacle may comprise damping elements as, for example, rubber mats or the like to prevent damage to the milling tools. However, it is ideal if the milling unit receptacle is configured such that it ensures that the milling unit does not rest on the support skid via its milling tools. This is achieved by at least one support beam, in particular two opposing support beams. Due to the support beams, a structure is obtained which allows for the milling unit to rest on the support skid via, in particular lower, areas of the milling drum box, in particular its longitudinal bottom edges. In this embodiment of the present invention, the weight of the milling unit is thus transferred to the support skid via the milling drum box, not via elements of the milling drum per se. Correspondingly, it is ideal according to one embodiment if the aforesaid support tray is designed in the shape of a cavity between two such support beams. The support beam needs not be designed to be continuous over the entire length as segment-type variants are also conceivable. What is important is that the support beam enables support of the milling unit on the support skid via parts of the milling drum box. Additionally, or alternatively, the milling unit receptacle may further comprise a displacement lock. The object of the displacement lock is to stabilize the milling unit in its position relative to the milling unit receptacle once it has been placed on the milling unit receptacle. The displacement lock may comprise corresponding receptacles to that end, into which individual elements of the milling unit protrude, in particular coming from above, and are secured in a form-fitting manner, in particular against movements in the horizontal plane. Additionally, or alternatively, it is also possible to obtain the displacement lock via a separate device, as, for example, via corresponding latch, screw, clamp or other securing devices.

In one embodiment of the present invention, the transport device comprises a rotating device in order to increase the range of movement of the milling unit, when placed on the support skid, relative to the support frame. Said rotating device is, for example, configured such that the support skid can be rotated about a vertical axis relative to the support frame. The rotating device thus provides an additional displacement possibility of the support skid and thus of the milling unit placed on the support skid, so that movement of the milling unit toward the road milling machine via the support skid is selectively possible along a longitudinal side or a narrow side of the transport device, for example. Such a rotating device may in particular be a rotary plate or the like.

In order to improve the maneuverability of the transport device, the transport vehicle connector is preferably configured in the manner of a rotary joint and can, in particular, be rotated about a vertical rotation axis. This allows for the transport device to be maneuvered on the ground via steering and travelling movements of the carrier vehicle.

In general, it is possible that the support skid is manually displaceable on the support frame. However, in view of the usually high weight of the milling unit, it is more comfortable and thus preferred if the transport device comprises a separated drive device which drives the displacement movements of the support skid. Such a drive device may be a drive engine, for example, such as, in particular, an electric engine or a hydro engine. In practice, however, use of a hydraulic piston-cylinder unit or a spindle drive has proven of value, in particular if only linear displacement of the support skid on the support frame is intended. To that end, it is possible for the transport device to comprise a separate energy source such as, for example, a battery or the like. However, it is also possible that energy supply is effected via an external vehicle, in particular the road milling machine itself. To that end, corresponding power and/or hydraulic connections may be provided on the transport device, ideally as part of known quick connections.

In order to enable safe transporting of the milling unit on the transport device, a locking device is preferably provided, with which the support skid can be locked in at least one position relative to the support frame. In its activated position, the locking device thus arrests the support skid such that the support skid cannot not be displaced uncontrollably on the support frame. It is possible that the locking device is configured such that arrestment is only possible in one position, advantageously the transport position of the support skid. The locking device may, however, also be configured such that the position of the support skid can be locked in virtually any position along its movement track. To that end, the locking device may, for example, be configured as a braking device or the like.

An advantageous embodiment of the transport device furthermore lies with providing at least one drive-on ramp. Drive-on ramp refers to an element which is in particular substantially wedge-shaped and which bridges the height difference between the ground and, for example, the surface of the support frame via a slope or ascent. With such a drive-on ramp, a possibility can be created for the road milling machine, for example, to move over the support frame in an essentially unobstructed manner. As a result, particularly advantageous mounting and/or dismounting situations can be obtained, as will be described in more detail below. The drive-on ramp may be designed as a relatively wide single element, although it is preferred if the drive-on ramp comprises multiple single elements which are advantageously adjusted to the track width of the road milling machine, for example. Furthermore, it is possible to provide the drive-on ramp as a mounting element. However, it is more comfortable to arrange the drive-on ramp, in particular on the support frame, in a movable manner, for example, in a displaceable manner or with a pivot joint. The drive-on ramp can then be adjusted between a drive-on position, in which it is possible to drive from the ground onto the support frame, and a stowage position, in which the drive-on ramp is arranged as place-saving as possible. This may be effected manually, but in particular engine-driven as well.

If the transport device comprises, for example, a guiding device protruding beyond the support frame, as is the case, for example, when using guiding rails, specifically rail-type swells, the guiding rails per se represent a further drive-over obstacle. In this case, it is preferred if at least one swell-bridging structure is arranged between two swells in the drive-over direction, in particular on the support frame. The swell-bridging structure thus constitutes a height compensation between the two swells to enable travelling over the rail-type swells without problems.

Another aspect of the present invention is a transport vehicle with a carrier vehicle and a transport device for a milling unit, in particular a transport device according to the present invention. The carrier vehicle is in particular a swap body vehicle or a hooklift vehicle. Such vehicles are characterized by the fact that they comprise a loading arm which can be detachably connected with the transport and can be adjusted on the carrier vehicle between a transport position and a stowage position. If the loading arm is adjusted from the transport position to the stowage position via a pivot and/or displacement movement, this causes the transport device loaded onto the swap body vehicle to roll down and dump, usually to the rear side, until it stands on the ground. To that end, a hook element or a similar grabbing device is usually provided on the loading arm, which couples the transport device to the loading arm by connecting to the transport vehicle connector of the transport device. The transport device can thus be loaded and unloaded from the carrier vehicle using the loading arm.

Another aspect of the present invention finally is a method for transporting a milling unit, in particular using a transport vehicle according to the present invention and/or using a transport device according to the present invention. The method according to an exemplary embodiment of the present invention comprises two transport phases which each per se as well as in combination are part of the present invention. A general object here is to transport the milling unit away from or to the road milling machine. The method according to the present invention thus facilitates the handling of the milling unit prior to and after the state mounted to the road milling machine. In this regard, the method according to the present invention for transporting a milling unit, in particular, uses a transport vehicle according to the present invention.

It is thus within the scope of the method according to the present invention that the milling unit is initially loaded onto a support skid of a transport device, in particular according to the present invention. This loading is effected preferably such that the milling unit is lowered from the road milling machine and placed on the support skid. For this, the support skid needs to be positioned underneath the milling unit and thus underneath the machine frame of the road milling machine. Lowering may, in particular, be effected by retracting the lifting columns of the road milling machine. Alternatively, it is possible to equip the support skid with a lifting device such that the support skid may be lifted toward the milling unit. Once the milling unit has been loaded onto the support skid, the respective connections between the milling unit and the road milling machine, for example, fastening connections and/or drive connections, are released. To that end, use may, in particular, be made of respective quick connections. In a next step, the support skid together with the milling unit is displaced relative to the support frame of the transport device. Such a displacement, in particular, relates to a linear pushing movement along the longitudinal axis of the support frame, in particular in order to remove the milling unit from the area underneath the road milling machine and to position it in an area next to the road milling machine. This may also serve to create free space for movement for the road milling machine such that it can move away from the transport device without the milling unit. Finally, the transport device together with the milling unit is loaded onto a carrier vehicle, in particular a swap body vehicle as disclosed above. Usually, loading is effected using a lift and pull movement on the transport device which is effected by corresponding movement of the loading arm of the swap body vehicle. In this manner, the transport device can be lifted and loaded onto the support frame of the carrier vehicle in a roll-dump-movement. The advantage of this method according to the present invention is on the one hand that no expensive special vehicle is needed for dismounting the milling unit, as the comparably simple transport device can be used instead. At the same time, a reliable and safe transport of the transport device is possible, as said transport device can be picked up by a conventionally used swap body vehicle. The transport device with which the milling unit is pre-positioned relative to the road milling machine or with which the milling unit is removed from the road milling machine is thus at the same time also the transport device with which the milling unit is transported from one place to another.

Additionally, or alternatively, the method for transporting a milling unit also refers to the reversed process, i.e., delivering the milling unit to a road milling machine with the transport vehicle to mount the milling unit to the road milling machine. To that end, the transport device together with the milling unit is first unloaded from the carrier vehicle. This is also effected via movement of the loading arm resulting in a roll-dump-movement of the transport device from the support frame of the carrier vehicle down to the ground. For transport purposes, it is preferred if the milling unit is arranged rather centrally on the transport device. In order to improve the mounting conditions, the method according to the present invention further comprises displacement of the milling unit relative to the support frame of the transport device using a support skid. As a result, the milling unit can be moved into the vicinity of the road milling machine, in particular be pushed under the machine frame of the road milling machine, without movement of the transport device being required therefore. Once the milling unit has reached its desired pre-position relative to the road milling machine, the milling unit is fastened to the road milling machine using measures known in the art, for example, screw bolts, quick connections etc. Further, corresponding drive connections between the milling unit and the road milling machine are established.

The milling unit is usually suspended on the bottom side of the machine frame of the road milling machine. Furthermore, road milling machines are often configured so as to be height-adjustable, for example, in order to regulate the milling depth. Thus, it is particularly preferred in the method according to the present invention if loading of the milling unit is effected by lowering the milling unit onto the support skid. The support skid thus is preferably configured such that the milling unit can be loaded onto it from above. For lowering and placing the milling unit onto the support skid from above, the already existing height adjustment options of the road milling machine can be used, so that special devices on the transport device can be dispensed with.

As described above, the milling unit is preferably arranged rather centrally on the transport device with respect to both the longitudinal extension and the horizontal width of said transport device. This central position is also called transport position and refers to the preferred position of the support skid on the support frame for the actual transport process, in particular also for the loading and/or unloading process of the transport device from the carrier vehicle. For moving the milling unit under the machine frame of the road milling machine, the method according to the present invention preferably comprises displacement of the support skid into a mounting position. Mounting position refers to a position in which the milling unit is, in particular, displaced to the end of the support frame opposite the transport vehicle connector or even beyond the lateral extension of the support frame via corresponding mounting elements. Thus, the mounting position refers to a position of the support skid in which the milling unit can be connected to the road milling machine or can be lowered therefrom onto the support skid. Therefore, the mounting position is preferably selected such that as few potential obstacles as possible, in particular vertically protruding obstacles, are present near the milling unit in order to enable free access to the milling unit and to the road milling machine for mounting and/or dismounting purposes.

Additionally, or alternatively, the method according to the present invention may also comprise displacement of the support skid into a milling machine maneuvering position. The milling machine maneuvering position is characterized in that, using the support skid, the milling unit is displaced to one side, in particular to the transport vehicle connector, such that a part of the support frame is exposed and can be driven over, for example, by the milling unit. Thus, it is possible to bring the road milling machine, in a self-propelled manner and without movement of the transport device, to a position in which a part of the support frame is located under the machine frame. Once the support skid including the milling unit has been positioned in a milling machine maneuvering position, the road milling machine may thus partially move over the support frame and be positioned or parked in a favorable mounting pre-position. Thereafter, the support skid is displaced from the milling machine maneuvering position to the mounting position, from where the milling unit can then be mounted to the road milling machine. To that end, the support skid with the milling unit only needs to be moved along the support frame. The transport device, or the support frame, per se stays in place, as ideally does the road milling machine. It will be readily understood that this sequence may correspondingly also apply with respect to the movement of the support skid for dismounting and the loading of the milling unit onto the support skid.

When the transport device together with the milling unit is to be unloaded from and/or loaded onto the carrier vehicle, it is important that the support skid is not uncontrollably displaced on the support frame by the roll-dump-movement with which the transport device is lifted onto the carrier vehicle. The method according to one embodiment of the present invention thus preferably comprises locking of the support skid, in particular in the above-mentioned transport position, before the transport device is loaded onto the carrier vehicle. This ensures that relative movement of the support skid relative to the support frame is prevented by a suitable locking device. Correspondingly, in an exemplary embodiment of the method according to the present invention, the locked support skid is unlocked after unloading the transport device so that the skid can then be displaced on the support frame according to the above-mentioned steps.

Additionally, or alternatively, the method according to the present invention may further comprise rotating the milling unit using a rotating device of the transport device. The background of the embodiment of the present invention is in particular that, for transport purposes, the milling unit is usually arranged on the transport device with the rotation axis of the milling machine extending in the longitudinal direction of the transport device for reasons of space. If, out of this situation, the transport device can only be positioned next to the longitudinal side of the road milling machine for reasons of space, the milling unit needs to be pushed to the longitudinal side of the support frame under the road milling machine. In order to position the milling unit in its required pre-position for mounting, it is thus required to rotate the milling unit by 90° such that its rotation axis extends transversely to the longitudinal extension of the transport device. This can be effected using the rotating device, for example, a suitable rotary plate. Here, the rotation plate can be provided as a part of the support frame such that the support skid is rotated together with the milling unit. Additionally, or alternatively, however, it is also possible to provide the rotating device as a part of the support skid.

As described above, it is preferred if the method according to the present invention provides at least partially travelling over the transport device and, in particular, the support frame by the road milling machine. The advantage of this procedure is that the relative positioning between the road milling machine and the transport device is effected by maneuvering of the road milling machine, and, additionally, that a part of the support frame may already be positioned underneath the road milling machine. As a result, the required movements of the support skid on the support frame can be reduced to a minimum and the space needed for the entire mounting process is comparably small. To facilitate travelling over the transport device and, in particular, the support frame by the road milling machine, driving up and down corresponding drive-on ramps, in particular ramps arranged on the support frame, may be comprised.

BRIEF DESCRIPTION OF THE DRAWINGS

The present invention will be described in more detail below with reference to the exemplary embodiments shown in the figures. In the schematic figures.

Like components are designated by like reference numerals throughout the drawings, wherein not each of the components is necessarily repeatedly designated in each figure.

DETAILED DESCRIPTION OF THE INVENTION

Figure 1:
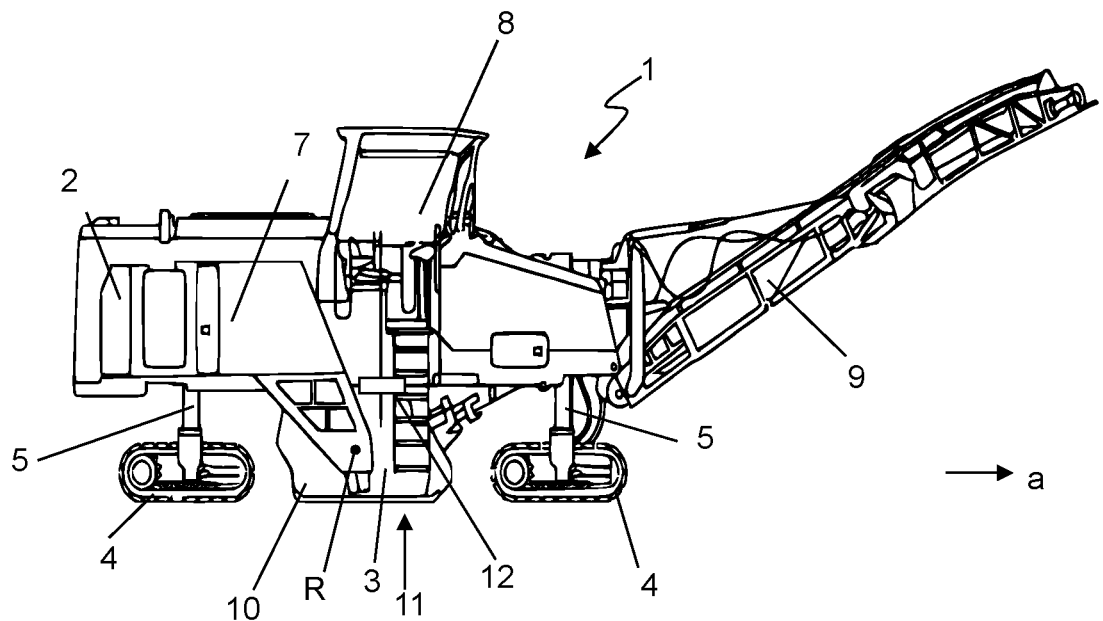
FIG. 1 is a side view of a road milling machine.

FIG. 1 shows a road milling machine 1, in the present case a cold road milling machine of the large-scale, central rotor milling machine type. Essential elements of the road milling machine 1 are a machine part 2 and a milling unit 3. The machine part 2 comprises a machine frame 6 which is supported by travelling devices 4 via lifting columns 5 and comprises a drive engine 7, an operator platform 8 and a milled material conveyor device 9. The lifting columns 5 allow height adjustment of the machine frame 6 and the milling unit 3 fastened thereto in the vertical direction relative to the ground. The drive engine 7 supplies the drive energy required for the propulsion of the machine and the drive of the milling unit, which will be described in more detail below. From the operator platform 8, operation of the road milling machine 1 is effected during working operation by an operator. During working operation, the road milling machine 1 travels over the ground to be processed in the working direction a and mills ground material. Specifically, this is effected by means of the milling unit 3, comprising a milling drum box 10 as well as a milling drum 11 arranged inside the milling drum box 10. The milling drum box 10 comprises a front wall, a back wall, a cover located above the milling drum 11, as well as covers to the right and left sides. Toward the ground, the milling drum box 10 is designed to be open so that the milling drum 11 positioned inside the milling drum box 10 can engage the ground. During milling operation, the milling drum 11 rotates about a horizontal rotation axis extending transversely to the working direction a.

The milling unit 3 is configured to be demountable as a modular unit relative to the machine part 2 of the road milling machine 1, for example, for transport or exchange purposes. To that end, a fastening device 12, which is merely schematically indicated in FIG. 1, for connecting the milling unit 3 to the machine part 2 is provided. It will be readily understood that for mounting/dismounting the milling unit 3, the power train, which is partially configured as a belt transmission in the present embodiment, has to be disconnected and re-established after installation of the milling unit 3. As an alternative, a drive connection to a hydraulic system is possible here as well. Basically, suitable quick-coupling systems may be considered for establishing energy and/or drive connections between the milling unit 3 and the road milling machine 1.

Figure 2:
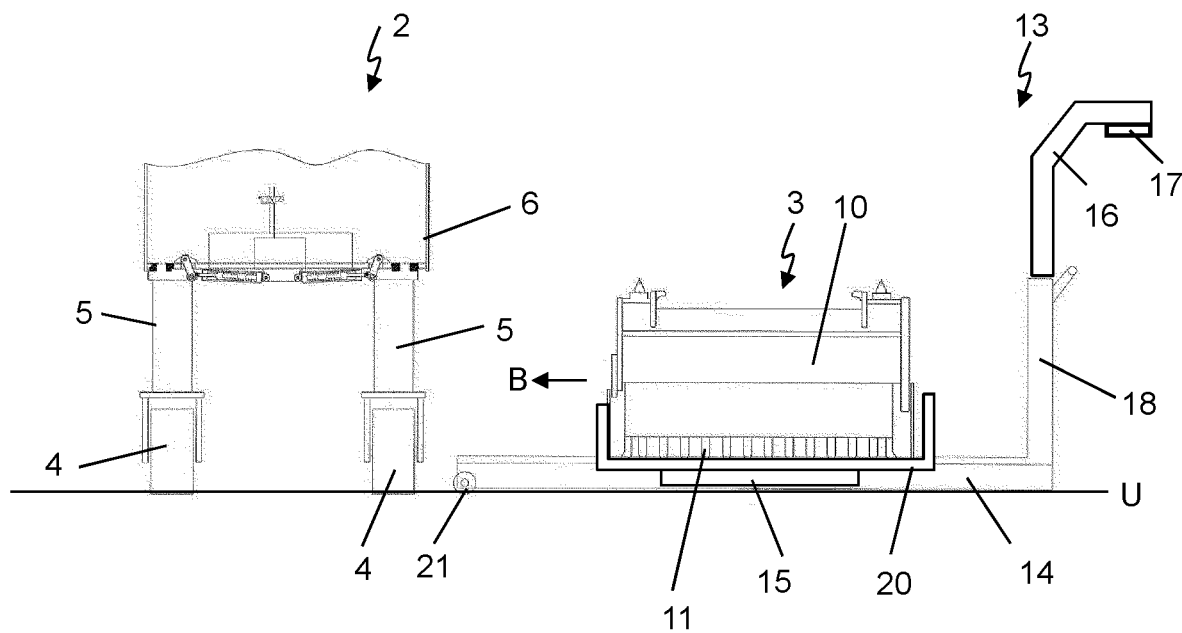
FIG. 2 is a view of a road milling machine and a transport device with milling unit.

In order to enable a most simple transport of the road milling machine 1, the milling unit 3 can be transported separately from the road milling machine. To that end, a transport device 13 is provided. This device is further illustrated in FIG. 2. The essential elements of the transport device 13 include a support frame 14, a support skid 15 and a transport vehicle connector 16 for coupling to a carrier vehicle. The support frame 14 comprises a frame-like overall structure and may optionally comprise a support surface as a bottom or be formed as a bottom per se. The horizontal basic shape of the support frame 14 is usually essentially rectangular, its longitudinal extension L extending in the transport direction, i.e., the direction in which the transport device 13 is transported in the loaded state. The milling unit 13, coming from above, can be placed on the support frame 14. The support frame 14 further has an essentially flat shape, so that it has a comparatively small vertical extension, except for the area of the transport vehicle connector 16. This particularly facilitates positioning of the milling unit 3 underneath the road milling machine 1. Starting from the transport position of the support skid 15 shown in FIG. 2, the transport skid 13 can, for example, be displaced relative to the support frame 14 in the direction of arrow B.

The transport device 13 is further designed in the manner of a dumper trough, which however only refers to the possibility to load and unload onto a vehicle such as, in particular, a swap body vehicle/hooklift vehicle, and not to a trough-shaped design. For loading on or unloading from a carrier vehicle, the transport device 13 comprises a connection structure 18 as a part of the transport vehicle connector 16, said connection structure projecting in a vertical direction from the essentially horizontally extending support frame 14, the support structure having on its end a loading arm connection 17, for example, in the form of a hook eyelet. For loading and unloading the transport device 13 or else maneuvering it on the ground, the carrier vehicle can couple into said eyelet with its loading arm, as will be explained in more detail below. Specifically, the connection structure is a face wall reinforced with struts.

The transport device 13 further comprises a milling unit receptacle 20 as a part of the support skid 15. This is a device into which the milling unit 3 can be lowered, in particular from above, and which stabilizes the positioning of the milling unit 3 on the transport device 13, specifically the support skid. The milling unit receptacle 20 thus is partially adjusted to the respective geometric and functional features of the respective milling unit 3. According to a further embodiment of the present invention, the milling unit receptacle 20 is therefore configured to be exchangeable on the support skid 15 in order to be able to also transport milling units 3 which differ significantly from one another with the transport device 13.

The transport device 13 may further comprise ground rolls 21, which are arranged, in particular, on the face side of the support frame 14 opposite the transport vehicle connector 16 of the transport device 13. Via said ground rolls 21, it is possible to roll the transport device 13 in a state slightly lifted above the ground via the transport vehicle connector 16 without damaging the ground. The ground rolls may be supported individually on the support frame, or they may also be connected to one another via an axle 29 (see FIG. 3).

Figure 3:
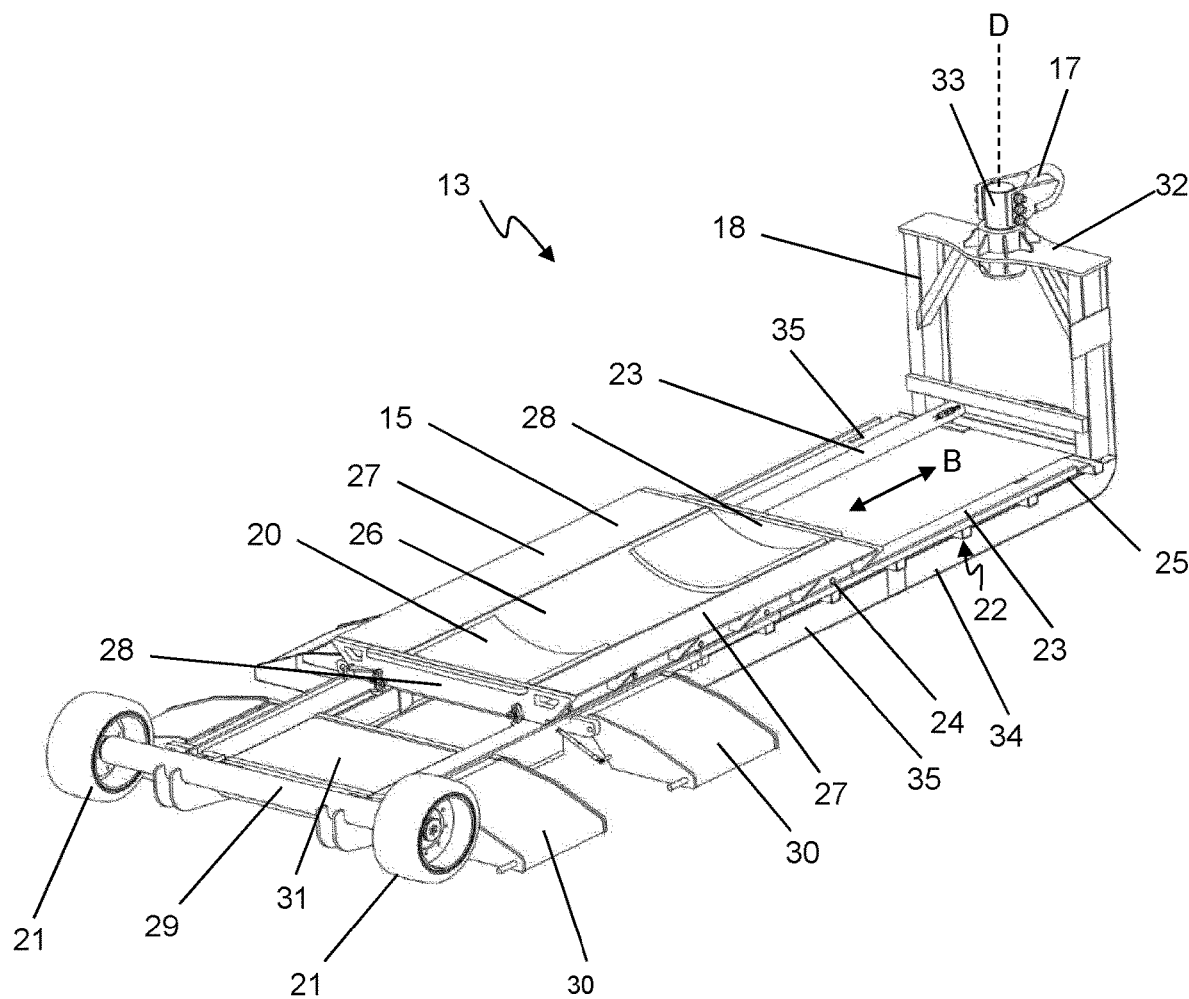
FIG. 3 is a perspective oblique view of a transport device of a first embodiment with the support skid in transport position.
Figure 4:
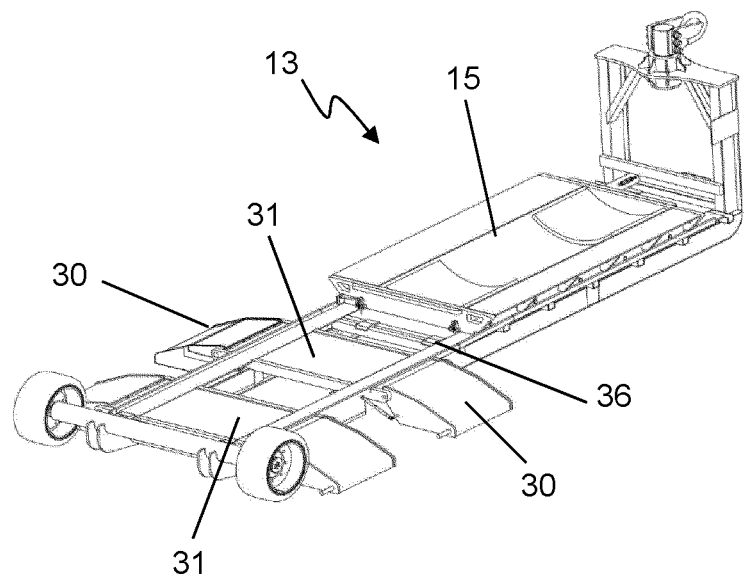
FIG. 4 shows the transport device of FIG. 3 with the support skid in maneuvering position.
Figure 5:
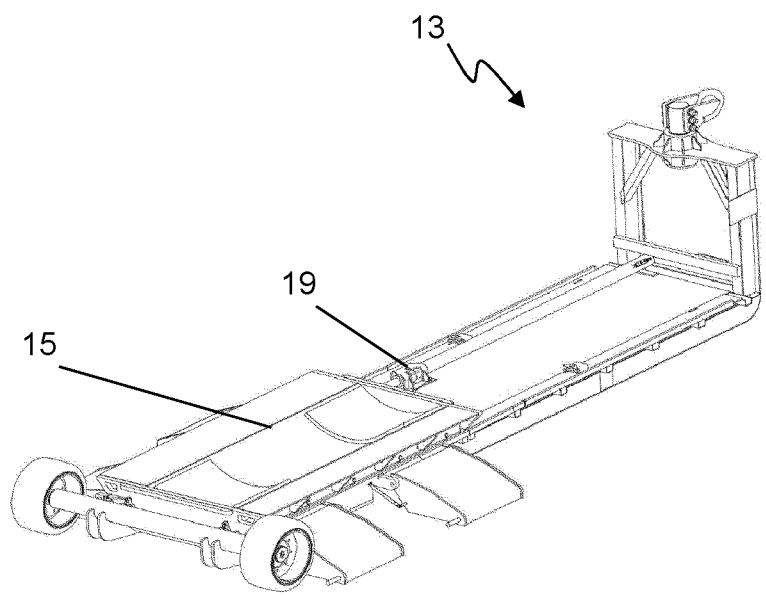
FIG. 5 shows the transport device of FIGS. 3 and 4 with the support skid in mounting position.

FIGS. 3 to 5 illustrate further details of a first embodiment of the transport device 13. The basic structure of the transport device 13 comprises a bottom structure 34 which essentially consists of two longitudinal struts 35 extending parallel to one another in the longitudinal direction L, and of transversal struts 36. On said bottom structure 34, the support skid 15 is supported in a displaceable manner. The support skid 15 is linearly displaceable along a movement track along the direction of arrow B in the longitudinal direction L of the transport device 13. In FIG. 3, the support skid 15 is shown in a more or less central transport position, in FIG. 4 in a maneuvering position displaced toward a face side, specifically the face side of the transport vehicle connector 16, and in FIG. 5 in its other extreme position on the side opposite the transport vehicle connector 16, i.e., in mounting position. The movement of the support skid 15 is effected engine-driven using an actuator 19 which in the specific exemplary embodiment of the present invention is a piston-cylinder unit. Alternative drive systems or manual displacement of the support skid 15 may also be used.

Displacement of the support skid in the direction of arrow B is further effected in a guided manner using a guiding device 22 comprising two track rails 23 spaced apart and extending in the longitudinal direction L, on which rolls 24 (in the figures only the outer axle parts of the rolls can be seen) arranged on the bottom surface of the support skid 15 run along. The track rails 23 comprise toward their respective outer side a limiting wall 25 projecting from the track surface, which wall on the one hand serves as a protection of the roll area toward the outside and on the other hand causes the support skid 15 to be forcedly guided along the track rails 23 in the direction of arrow B.

The support skid 15 further comprises a milling unit receptacle 20. Milling unit receptacle 20 refers to an area of the support skid 15 which, with respect to its surface design, is, in particular, adjusted to the lower part of the milling unit 3 and enables the reliable support thereof. In the exemplary embodiment of the present invention according to FIGS. 3 to 5, the milling unit receptacle 20 is generally configured to receive the milling unit 3 when being lowered from above. Coming from above, the milling unit 3 can thus be placed down onto the milling unit receptacle 20 of the support skid 15. Essential components of the milling unit receptacle 20 are the support tray 26 as well as two opposing support beams 27. The support tray 26 is designed in the form of a tray curved about one axis, corresponding to the outer surface of a cylinder segment. The curvature of the tray is, in particular, adapted to the cutting circles of the milling unit 3 to be received. The opposing horizontal support beams 27 adjoining the longitudinal edges of the support tray represent a support surface for parts of the bottom edge of the milling drum box of the milling unit 3. With the support tray, a receptacle cavity is obtained between the support beams 27, in which the projecting milling chisels of the milling unit 3 can be received. This may achieve that the milling unit does not completely, ideally not at all, rest on the milling unit receptacle 20 via its milling tools. The support tray 26 further is limited in the longitudinal direction by respective end walls 28, the upper edge of which is flush with the surface of the support beams 27. This ensures that the milling unit 3 assumes a defined position on the support skid 15 as the projecting milling drum needs to positioned be between these end walls.

The transport device 13 further comprises drive-on ramps 30 on both its transverse sides, which are respectively arranged in pairs on the support frame and which are mounted on the support frame such that they can pivot between the drive-on position shown in FIG. 3 and, in contrast thereto, a stowage position in which they are pivoted upward on the support frame 14. The drive-on ramps facilitate travelling over the support frame with a road milling machine as they provide an ascent for driving up, which bridges the height difference between the ground and the upper surface of the support frame 14. A swell-bridging structure 31 is further arranged on the support frame 14 between the two track rails 23 at the height of each of the pairs of opposing drive-on ramps. The bridging structure 31 provides some sort of track for the area between the track rails 23 to enable proper driving over the track rails.

The transport device 13 further comprises the connection structure 18 arranged on the bottom structure of the transport device 13 and projecting therefrom, comprising longitudinal and transversal struts. The connection structure 18 is arranged on the face side of the support frame 14 opposite the ground rolls 21. A support table 32 is provided above the connection structure 18 to which is mounted a rotary joint 33 via which the loading arm connection 17 designed as hook eyelet can rotate about a vertical rotation axis D relative to the transport device. This device facilitates maneuvering of the transport device 13 on the ground using a swap body vehicle.

With respect to the method sequence according to the present invention, according to the exemplary embodiment of the present invention shown in FIGS. 3 to 5, the transport device is loaded and unloaded from the carrier vehicle, for example, with loaded milling unit 3 and the support skid in the position shown in FIG. 3. The support skid 15 is located in a nearly central position relative to the longitudinal extension of the transport device 13. If a milling unit 3 is to be loaded onto the support skid 15 or to be mounted to a road milling machine from said skid, the transport device 13 is first unloaded from the carrier vehicle onto the ground. Then, the support skid 15 is displaced on the support frame from the transport position shown in FIG. 3 into the maneuvering position according to FIG. 4 on the face side opposite the ground rolls 21. FIG. 4 illustrates that a free space for two tracks (each comprising two drive-on ramps 30 and a bridging structure 31) is created on the transport device 13, so that this area can be driven over, for example, by the front or rear pair of travelling devices of a road milling machine. If the road milling machine is stopped then, the mounting area on the machine frame of the road milling machine is thus already located above the support frame 14 of the transport device 13. The support skid 15 is then displaced from the maneuvering position to the opposite face side of the transport device 13 until it has reached its mounting position according to FIG. 5. Thus, neither the road milling machine 1 nor the transport device 13 needs to be moved in order to position the milling unit underneath the road milling machine or, vice versa, to remove it from there. This is exclusively achieved by the displacement movement of the support skid 15. This significantly facilitates the mounting process.

Figure 6:
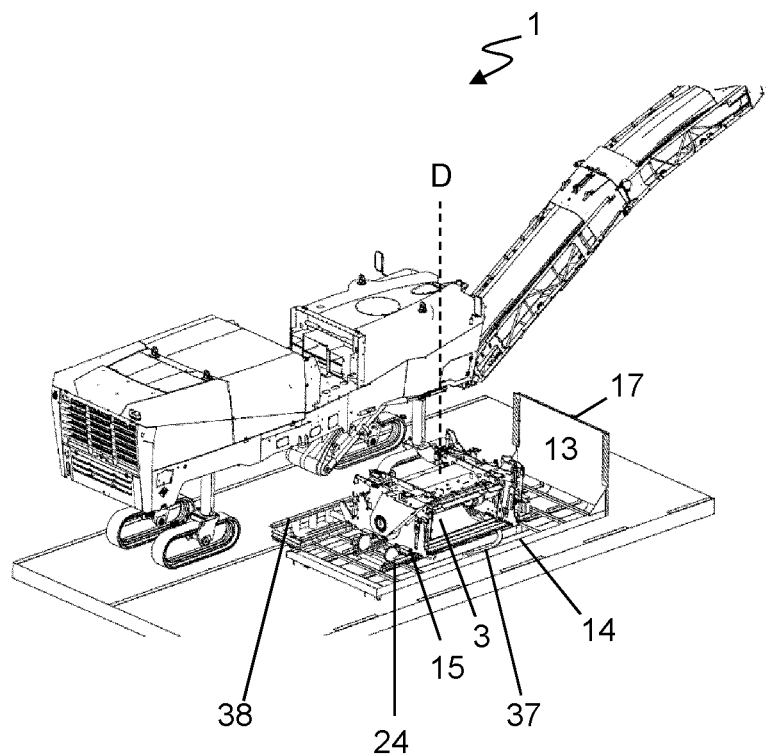
FIG. 6 shows an alternative embodiment of a transport device.
Figure 7:
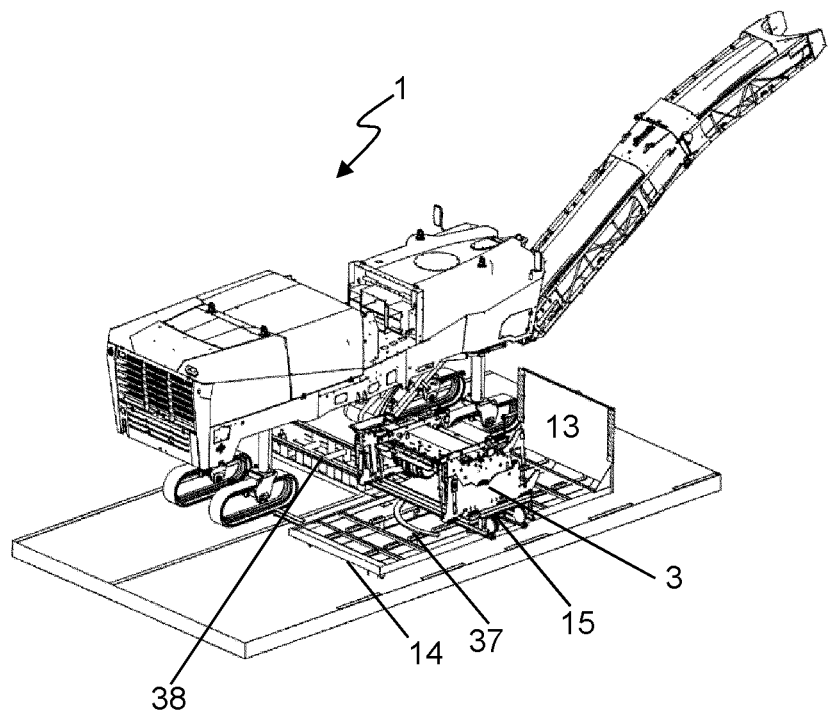
FIG. 7 shows the embodiment of the transport device of FIG. 7 with mounted rail extension and rotated milling unit.

FIGS. 6 and 7 describe another alternative embodiment of the transport device 13.

The essential differences of the transport device 13 of FIGS. 6 and 7 are that, other than the preceding exemplary embodiment, it comprises a rotating device 37 as well as a rail extension 38. The advantage of this arrangement becomes clear from the initial situation shown in FIG. 6. There, the transport device 13 is placed down on the ground and the milling unit 3 is oriented with its rotation axis in the longitudinal direction of the transport device 13. If, for example, due to the space available, the transfer of the milling unit 3 to underneath the road milling machine is to be effected via a longitudinal side of the transport device 13, first the rotating device 37 is used to rotate the milling unit 3 on the support frame 14 together with the support skid 15 about a vertical axis by 90°. This can be seen by a synopsis of FIGS. 6 and 7. The additionally provided rail extension 38 serves as a means for extending the guidance of the support skid 15 beyond the support frame 14. In the present exemplary embodiment of the present invention, the rail extension 38 thus is an adjustable track for the support skid 15, which can be adjusted from an intermediate position shown in FIG. 6 (for transport purposes, the rail extension can be pivoted upwards on the support frame 14) into a position leading to underneath the milling machine standing next to the transport device 13. This then enables displacement of the support skid 15 including the milling unit 3 from the support frame 14 to underneath the road milling machine 1 for further mounting purposes.

Figure 8:
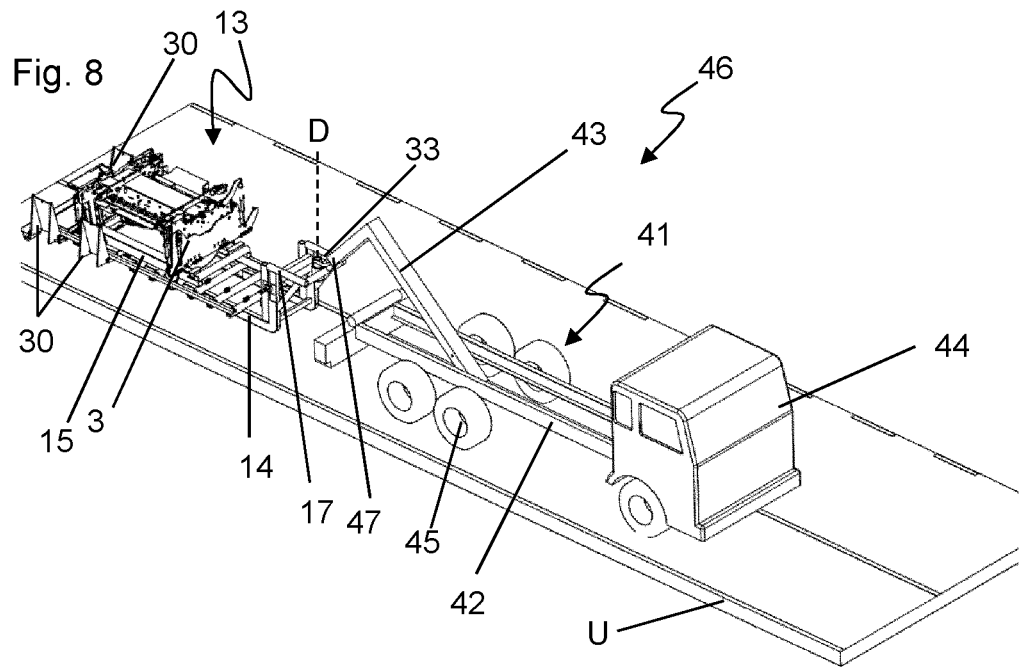
FIG. 8 shows another alternative embodiment of a transport device with a carrier vehicle.
Figure 9:
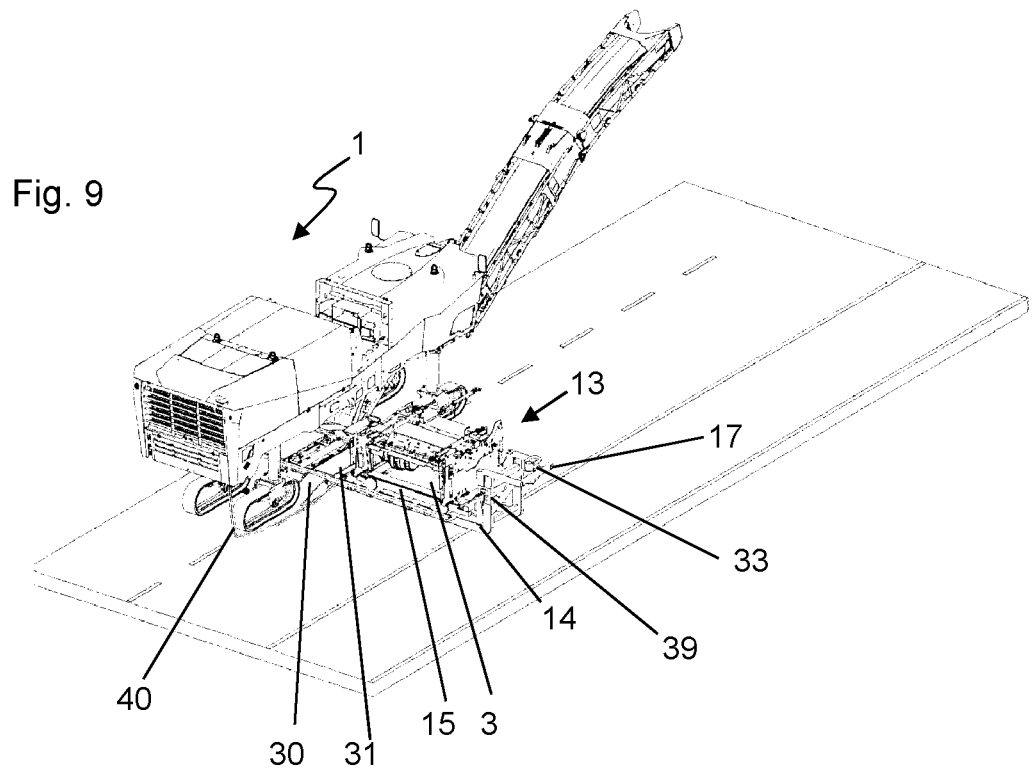
FIG. 9 shows the transport device of FIG. 8 with the road milling machine in mounting position and the milling unit in maneuvering position.
Figure 10:
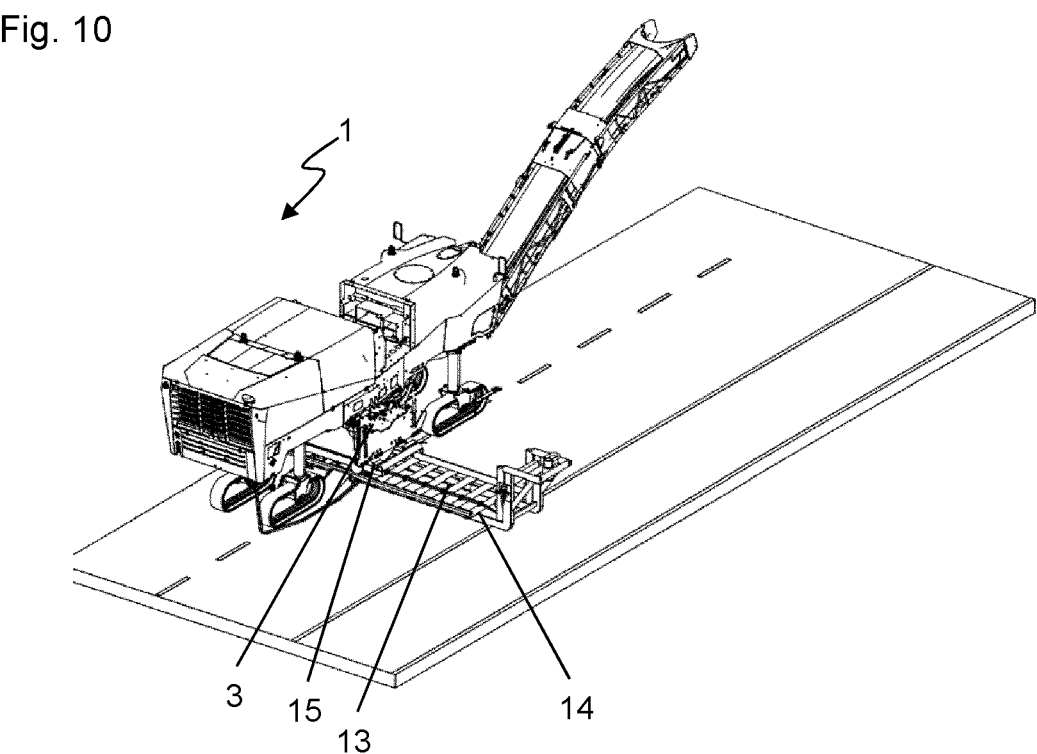
FIG. 10 shows the transport device of FIG. 9 with the milling unit in mounting position.

Finally, FIGS. 8 to 10 show the method according to the present invention using the transport device 13, the transport device 13 of FIGS. 8 to 10 essentially corresponding to the transport device of FIGS. 3 to 5. However, the transport device 13 comprises a supply port 39 via which it can be connected with the supply system of the road milling machine using a connection line 40. The engine-driven displacement drive of the support skid 15 of the transport device 13 thus receives its drive energy from the road milling machine 1. Within the scope of the present invention, this is possible as well for the exemplary embodiment of the present invention according to FIGS. 3 to 5. In contrast to the sequence described in FIGS. 7 and 8, the transport device 13 is in this case partially traveled over by the road milling machine 1 for mounting purposes.

FIG. 8 shows the delivery state of the milling unit 3. Here, details of the carrier vehicle 41 can, in particular, also be seen. The essential components of the carrier vehicle, which is specifically a swap body vehicle or a hooklift vehicle, are a machine frame 42 with a loading surface, a loading arm 43 with a loading hook 47 on its end, a driver's cab 44 as well as travelling devices 45. Further, the carrier vehicle 41 comprises a drive engine and thus is self-propelled. The entirety of the carrier vehicle and the transport device 13 forms a transport vehicle 46. The loading frame 43 is hydraulically adjustable between the loading position illustrated in FIG. 8 and a transport position in which it is positioned with its hook 47 close to the driver's cab 44.

In the situation shown in FIG. 8, due to the pivot of the loading arm connection provided by the rotary joint 33, the transport device 13 can be maneuvered using steering and travelling movements of the carrier vehicle 41. Once the desired position of the transport device 13 is reached, the carrier vehicle 41 is decoupled from the loading arm connection 17 and can be removed. Now, the support skid 15 is displaced from the transport position to the maneuvering position in the manner described above with reference to FIGS. 3 to 5, so that the rear area can be driven over by the road milling machine 1 via the drive-on ramps 30 until the situation visible in FIG. 9 is reached. Thereafter, the support skid 15 together with the milling unit 3 can be displaced to underneath the road milling machine 1 and into the desired mounting position, as shown in FIG. 10.

While the present invention has been illustrated by description of various embodiments and while those embodiments have been described in considerable detail, it is not the intention of Applicants to restrict or in any way limit the scope of the appended claims to such details. Additional advantages and modifications will readily appear to those skilled in the art. The present invention in its broader aspects is therefore not limited to the specific details and illustrative examples shown and described. Accordingly, departures may be made from such details without departing from the spirit or scope of Applicant's invention.

What is claimed is:

1. In combination, a transport device and a milling unit of a road milling machine including a milling drum box and milling drum arranged inside the milling drum box, the transport device comprising:
   a support frame;
   a support skid configured to support the milling unit, the support skid being arranged on the support frame in a displaceable manner in a horizontal plane and comprising a milling unit receptacle designed in a shape adapted to the milling unit;

a drive device configured to drive displacement movement of the support skid relative to the support frame; and a transport vehicle connector configured to be coupled to a carrier vehicle, wherein the transport device is configured to be lifted and lowered relative to the ground via coupling of the transport vehicle connector to the carrier vehicle.

2. The combination according to claim 1, wherein the support frame comprises at least one of the following features:

the support frame forms a bottom structure of the transport device;

the support frame is configured as essentially rectangular;

the support frame comprises at least one longitudinal and/or at least one transverse strut; and the support frame comprises at least one ground roll.

3. The combination according to claim 1, wherein a guiding device is arranged on the support frame which is configured such that the guiding device guides the support skid along a movement track.

4. The combination according to claim 3, wherein the guiding device comprises at least one of the following features:

the guiding device comprises at least one guiding rail on which a rolling device runs;

the guiding device comprises a guiding slot in which a rolling device runs;

the guiding device comprises a switch via which various guiding tracks may be linked; and the guiding device comprises at least one extension element, with which the guiding track may be extended beyond the support frame.

5. The combination according to claim 1, wherein the support skid comprises rolls with which the support skid rests on the support frame.

6. The combination according to claim 1, wherein the support skid comprises a milling unit receptacle.

7. The combination according to claim 6, wherein the milling unit receptacle comprises at least one of the following features:

the milling unit receptacle comprises a support tray which is upwardly open;

the milling unit receptacle comprises at least one support beam; and the milling unit receptacle comprises a displacement lock.

8. The combination according to claim 1, wherein a rotating device is provided which is configured such that the support skid can be rotated about a vertical axis relative to the support frame.

9. The combination according to claim 1, wherein the transport vehicle connector is configured in a manner of a rotary joint.

10. The combination according to claim 1, wherein a locking device is provided with which the support skid can be locked in at least one position relative to the support frame.

11. The combination according to claim 1, wherein at least one drive-on ramp is provided.

12. The combination according to claim 1, wherein a swell-bridging structure is provided between two rail-type swells.

13. A combination comprising the combination of claim 1 and a transport vehicle, the transport vehicle comprising a carrier vehicle including a loading arm which is detachably connectable to the transport device for the milling unit and can be adjusted on the carrier vehicle between a transport position and a loading position, wherein the transport device can be loaded onto and unloaded from the carrier vehicle using the loading arm.

14. The combination according to claim 1, wherein the carrier vehicle comprises a swap body vehicle.

15. A method for transporting a milling unit using the combination according to claim 14, comprising the steps of:

a) loading the milling unit from a road milling machine onto the support skid of the transport device;

b) displacing the support skid relative to the support frame;

c) loading the transport device together with the milling unit onto the carrier vehicle;

and/or d) delivering the milling unit with the transport vehicle;

e) unloading the transport device from the carrier vehicle;

f) displacing the milling unit relative to the support frame of the transport device using a support skid; and g) fastening the milling unit to the road milling machine.

16. The method according to claim 15, wherein in step a) loading is effected by lowering the milling unit onto the support skid.

17. The method according to claim 5, wherein in the course of steps a) to c) and/or d) to g) the support skid is displaced between an essentially central transport position and a mounting position and/or a milling machine maneuvering position.

18. The method according to claim 15, wherein, prior to step c), the support skid is locked in a transport position, and prior to step f), the locked support skid is unlocked.

19. The method according to claim 15, wherein, prior to step f), the milling unit is rotated via a rotating device of the transport device.

20. The method according to claim 15, wherein, between steps e) and g), the road milling machine at least partially travels over the transport device.

* * * * *